United States Patent [19]

Gray et al.

[11] 4,025,960

[45] May 24, 1977

[54] VARIABLE RELUCTANCE A.C. ELECTRICAL GENERATOR AND METHOD OF MAKING SAME

[75] Inventors: Alden J. Gray, Ashfield, Mass.; Ian S. Sanderson, Kennebunk; John C. Hardy, Gorham, both of Maine

[73] Assignee: Maremont Corporation, Chicago, Ill.

[22] Filed: June 2, 1976

[21] Appl. No.: 692,046

Related U.S. Application Data

[63] Continuation of Ser. No. 522,294, Nov. 8, 1974.

[52] U.S. Cl. .............................. 310/168; 310/60 R; 310/266
[51] Int. Cl.² ...................................... H02K 19/20
[58] Field of Search ............ 310/68 R, 168, 61, 62, 310/63, 266

[56] References Cited

UNITED STATES PATENTS

| | | | |
|---|---|---|---|
| 3,062,979 | 11/1962 | Jarret et al. ........................ | 310/168 |
| 3,312,844 | 4/1967 | Juhuke et al. ...................... | 310/168 |

FOREIGN PATENTS OR APPLICATIONS

| | | | |
|---|---|---|---|
| 1,260,406 | 1/1972 | United Kingdom ............... | 310/168 |
| 1,168,236 | 10/1969 | United Kingdom ............... | 310/168 |
| 1,051,595 | 12/1966 | United Kingdom ............... | 310/168 |
| 1,148,304 | 4/1969 | United Kingdom ............... | 310/168 |
| 528,020 | 10/1940 | United Kingdom ............... | 310/168 |
| 960,767 | 6/1964 | United Kingdom ............... | 310/168 |

*Primary Examiner*—Donovan F. Duggan
*Attorney, Agent, or Firm*—Cushman, Darby & Cushman

[57] ABSTRACT

A variable reluctance electrical generator is disclosed having a unique structure which, for any given design parameters, tends to maximize air gap areas and thus minimize mmf drops thereacross. The mean magnetic flux paths all generally include a constant reluctance parasitic air gap and a variable reluctance active air gap. The portion of the magnetic circuit defining the active air gap is adapted to magnetically saturate before the portion of the magnetic circuit defining the parasitic air gap areas thus eliminating the parasitic air gap as a design limitation. In the exemplary embodiment the parasitic air gap is located radially outwardly of the active air gap areas such that the parasitic gap reluctance is much less than the minimum active gap reluctance. The design of the alternator is also such as to simplify its assembly during fabrication and to thereafter permit ready disassembly of its major components from one another for repair or other purposes.

13 Claims, 11 Drawing Figures

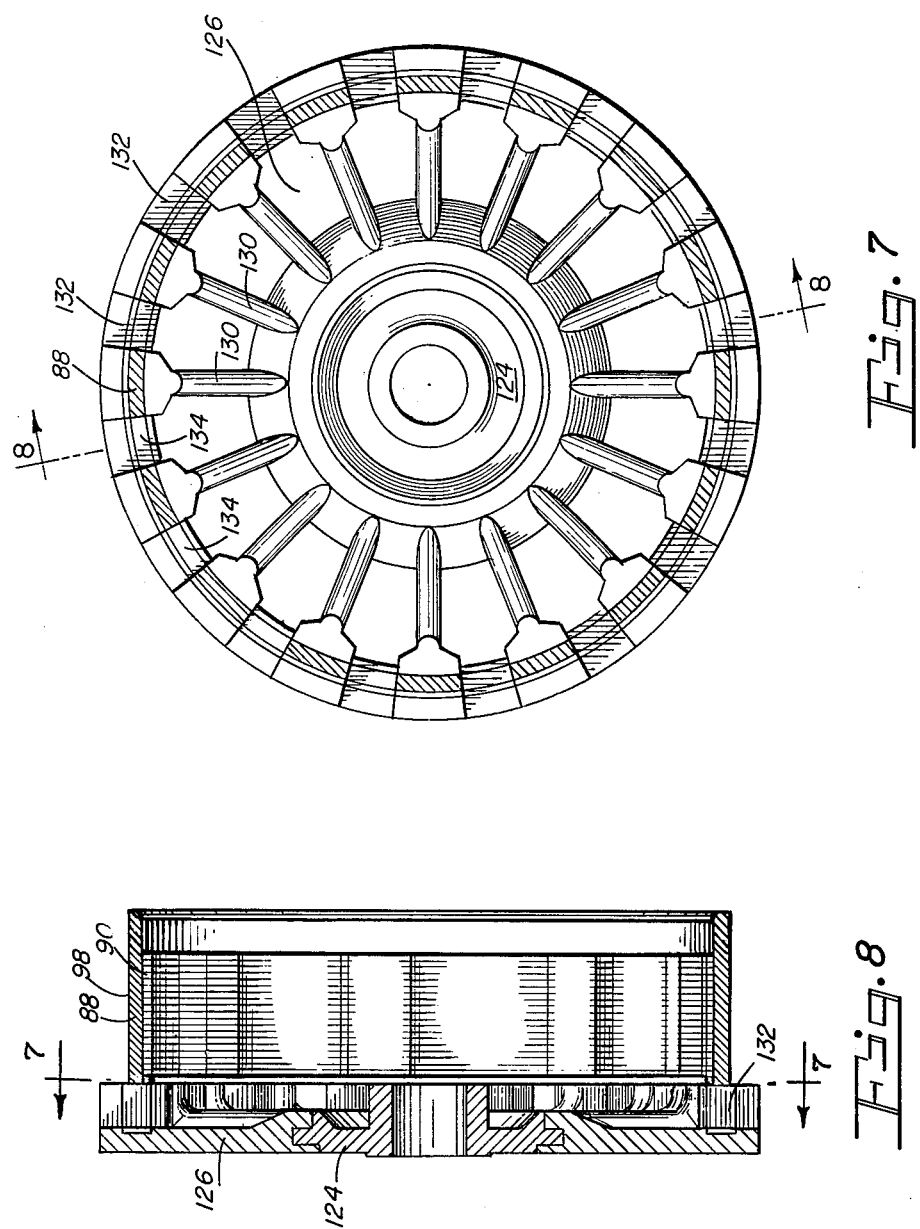

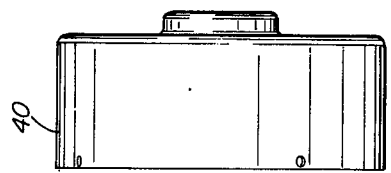
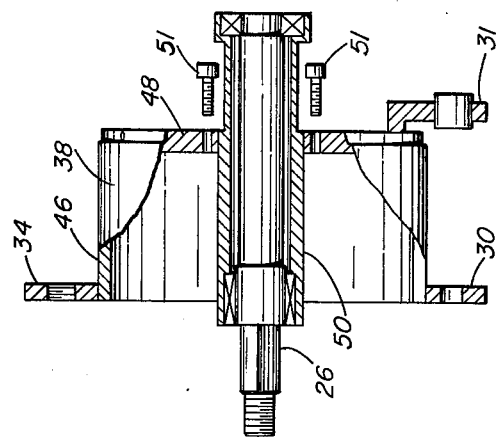
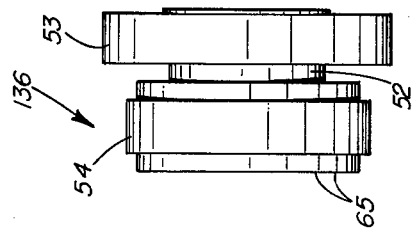
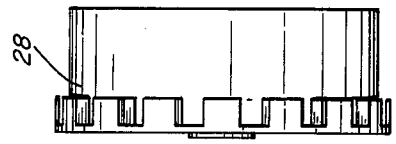
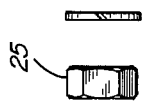
Fig. 10

VARIABLE RELUCTANCE A.C. ELECTRICAL GENERATOR AND METHOD OF MAKING SAME

This is a continuation of application Ser. No. 522,294 filed Nov. 8, 1974.

This invention relates to variable reluctance inductor alternators, and deals more particularly with improvements in the operation, design flexibility and construction of such as alternator and with an improved method for making the same.

The inductor alternator of this invention is related to the general type of variable reluctance inductor alternator shown generally for example by prior U.S. Pat. Nos. 515,386; 567,423; 2,976,439; 3,179,825; 3,219,859; 3,312,844 and 3,140,413. Such as alternator includes a stator structure of flux carrying magnetic material defining an annular cavity receiving both a field coil and an annular core carrying generating windings, and it also includes a rotor with a rotor pole defining core projecting in a cantilevered manner into the stator cavity for cooperation with the stator core to vary the magnetic reluctance of the flux path through the generating windings and hence to vary the magnetic flux linking the generating windings as the rotor rotates.

U.S. Pat. No. 3,140,413 to Terry, for example, shows a relatively large diameter rotor structure which, in part, is responsible for a rather large inertia associated therewith. There are electrical and electrically related mechanical advantages to such a relatively large diameter rotor size. For instance, the large diameter large area air gaps require minimum mmf to transfer magnetic flux thereacross. Actually, many of such prior art patents state that such designs represent an effort to achieve a high mechanical inertia for a fly wheel effect with respect to the prime mover. While this approach may have application for direct shaft coupled relatively small prime movers, the high inertia effect has been found to be actually detrimental when indirectly coupled (i.e. belts, gears, etc.) and/or relatively large size prime movers are considered.

Furthermore, the inwardly directed stator pole structures of the prior art usually involve the use of rather complicated winding machines for practical production. Such winding machines are not only a source of production time and expense, they tend to impose limits on the size of wire that may be used for such stator generator windings since the machines adapted for automatically winding pole coils on the inside of a circular stator structure cannot, as a practical matter, handle larger stiffer wire sizes desirable for low $I^2R$ losses in higher output alternators. Furthermore, the inherent geometry of locating windings on inwardly directed pole pieces limits the effectiveness of attempts to dispose pre-wound coils thereover.

In addition, such prior art constructions have inherently been design limited, at least in part, by the parasitic air gap. That is the means defining the parasitic air gap would usually be the first to saturate in the relevant magnetic circuit. Thus, each design alternative consideration (i.e. wire size, number of turns, pole dimensions, rated capacity, size, weight, etc) had to be considered only within the limitations of a relatively high parasitic air gap reluctance and the tendency of the means defining this gap to saturate before other parts of the relevant magnetic circuit.

Now, however, it has been discovered that the electrical-mechanical advantages of a large diameter rotor may be attained while minimizing undesirable mechanical inertia, while providing outwardly facing stator teeth to facilitate winding with wire of any desired size and while eliminating the parasitic air gap as a significant design limitation factor. These and other improvements result from this invention.

As compared to such prior art alternators, the inductor alternator of this invention has increased design flexibility, higher efficiency, longer service life, and/or other improvements. In particular, mmf drops across air gaps and leakage of flux from the rotor and stator poles are minimized by decreasing the reluctance of both parasitic and active air gaps relative to comparably sized prior art alternators and insuring that the parasitic air gap reluctance is always much less than the minimum active air gap reluctance thus eliminating the parasitic air gap as a design limitation. In the exemplary embodiment the parasitic air gap reluctance is on the order of one-tenth or less of the minimum active air gap reluctance. Further, the invention involves a structure which causes the means defining the active air gap to tend to saturate before the means defining the parasitic air gap thus further removing the parasitic air gap as a design limitation. In the exemplary embodiment it has been discovered that these desired results can be obtained by an arrangement of parts putting the parasitic and active air gaps at large diameters with the parasitic air gap being radially outwardly of the active air gap. The arrangement is also such that the stator core and field coil may be mounted on a tubular sleeve initially separate from the stator frame to enable preassembly of the field coil, stator core, generating windings and sleeve prior to the assembly of such parts with remainder of the stator structure.

The air gaps in this invention are at relatively large diameter and thus the rotor is necessarily also of a relatively large diameter. Nevertheless, the operating noise and moment of inertial are limited to acceptable levels by special features of this invention. Another feature of this invention is the convenient provision of an associated housing for a rectifier and/or other electrical components which may be used with the alternator.

The increased design flexibility provided by this invention permits many different options to the designer for filling a particular design requirement. For instance, increases space may be made available for the use of larger wire sizes, cheaper wire materials, more turns, etc. On the other hand, the overall size, weight, etc., might be reduced for a given capacity generator. There is almost an unending list of such design options provided in this invention.

The presently preferred exemplary embodiment of this invention has a stator of magnetic flux carrying material comprising a generally cylindrical housing or frame, substantially closed at one end (wire and air passages are provided therein) and open at the other end. An annular preassembled core of magnetic flux carrying material is received in the housing. The preassembly has radially extending teeth carrying generating windings thereabout and radially outwardly directed teeth faces. An annular rotor core of relatively small radial dimension and also comprising magnetic flux carrying material is located radially outwardly of and surrounding the stator teeth. The rotor has radially extending poles with radially inwardly directed pole faces which cooperate with the stator core teeth faces to define an annular series of active air gaps in the magnetic circuit defined by the flux carrying stator and rotor member, said active air gaps varying in reluctance as the rotor rotates. It should be noted that magnetic flux passes through only a small radially extending portion of the rotor so that the remainder of the rotor can be made of non-magnetic light weight material thus minimizing mechanical inertia. The rotor core also has a cylindrical external surface which cooperates with a complementary cylindrical internal surface of the stator housing to define a constant reluctance annular transfer or parasitic air gap. The diameter, and hence area, of the parasitic air gap is maximized by the parasitic air gap being radially outwardly of the active air gaps and substantially of the same diameter as the largest diametered internal surface of the stator housing. Also, the rotor and stator surfaces defining the parasitic air gap are located so as to be easily machined to close dimensional tolerances to maintain the length or radial dimension of the gap quite small. By thus maximizing the areas of the parasitic air gap and minimizing its length, the mmf drop across this gap is minimized to enhance the overall efficiency and performance of the alternator. The active air gaps are also located along a circle of relatively large diameter, and the surfaces defining them may therefore also be easily machined to close tolerances causing the active gaps to also have relatively large area and small length thereby also reducing the minimum mmf drop across the active gaps. Further, the circumferential spacing between the stator teeth and the circumferential spacing between the rotor poles is maximized which significantly lengthens leakage flux paths and thereby reduces the amount of actual flux leakage from the pole structures and/or air gap areas.

In the presently preferred exemplary embodiment, an annular field coil and the annular stator core are fixed to and surrounds an axially extending cylindrical support which is initially separate from the stator housing and which is fixed to the housing during the assembly of the alternator. This allows the field coil, the stator core, the generating windings and the support to be preassembled separate from the remainder of the stator housing prior to the subassembly being fitted into the housing. The support is held to the housing by screws or other removable fasteners to subsequently allow the subassembly to be removed from the housing for inspection, repair or other purposes. This also eliminates the usual need for providing extra space in the vicinity of the field coil and stator core which would otherwise be needed for assembly purposes. The method involved in this way of assembling an alternator is a part of the invention.

The exemplary embodiment includes a rotor core having a stack of annular laminations received within a tubular sleeve. The laminations of the stack are attached to one another by suitable means. An initially separate machined hub forms part of the rotor and is used to attach the rotor to a shaft. The remainder of the rotor is made of aluminum or other lightweight material which extends from and captures the peripheral edge portion of the hub and the outboard edge portion of the core sleeve, and the lightweight material is shaped to provide vanes serving as a fan for inducing cooling air through the alternator.

The exemplary embodiment includes a stator structure having a tubular shaft retainer which extends through the center of the stator housing and outwardly beyond the end wall thereof. The retainer receives a shaft for rotatably supporting the rotor, the shaft being rotatably supported by two bearings at opposite ends of the retainer. The rotor is mounted onto the shaft at the open end of the stator housing so that only a single dynamic sealing interface is required to seal lubricant in the retainer. Such as interface may comprise a single seal or a mulitplicity of seals to contain the lubricant for the life of the unit. A generally cup-shaped and thin-walled cover is attached to the closed end of the housing and, in addition to enclosing the portion of the shaft retainer which extends beyond the housing end wall, in combination with the end wall defines a chamber for containing a rectifier and/or other circuit components used with the alternator, such components, preferably being attached to the end wall so as to be exposed yet retained in place when the cover is removed.

These and other objects and advantages of this invention will be more fully understood from the following detailed description taken in conjunction with the accompanying drawings, of which:

FIG. 7 is a transverse sectional view taken on the line 7—7 of FIG. 4;

FIG. 8 is a longitudinal sectional view taken through the rotor on the line 8—8 of FIG. 7;

FIG. 10 is an exploded view, partly in elevation and partly in section, showing the major parts making up the alternator of FIG. 1.

Figure 1:
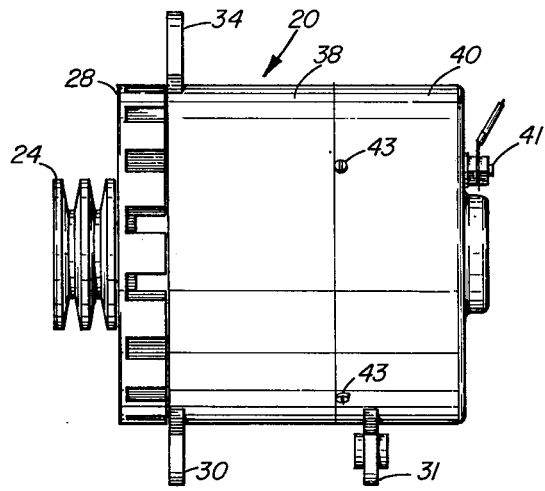
FIG. 1 is a side elevational view of an exemplary embodiment of the inductor alternator embodying this invention.
Figure 2:
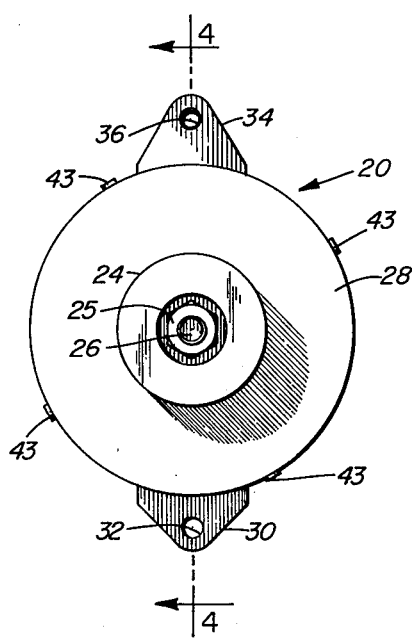
FIG. 2 is a front elevational view of the alternator of FIG. 1.
Figure 3:
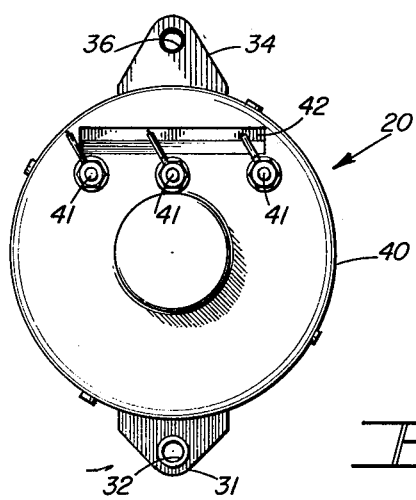
FIG. 3 is a rear elevational view of the alternator of FIG. 1.

Referring to FIGS. 1, 2 and 3, these figures show, in external views, a presently preferred exemplary embodiment of an inductor alternator 20 embodying the present invention. This alternator is adapted to be belt driven and may, for example, be used in association with an engine as an electrical power source for a vehicle such as an automobile or truck. It includes a grooved pulley 24, for cooperation with driving belts, fixed to a shaft 26 to which is also fixed a rotor 28. The mounting means for the alternator may vary, but in the illustrated case, it is of a standard type conventionally used for automotive or other belt driven application, the mounting means consisting of two axially spaced mounting lugs 30, 31 having aligned openings 32, 32 and a third diametrically opposite lug 34 with an opening 36.

The exposed portion of the rotor 28, which is seen in FIGS. 1 and 2, provides a fan for drawing cooling air through the alternator body. The construction of the rotor is explained in more detail hereinafter, however, at this point it should be noted that its exposed surfaces are smooth and free of sharp edges and protrusions so as to present no substantial safety hazard during rotation.

In addition to the rotor 28, the alternator 20 includes a stator structure comprised basically of a magnetic flux carrying housing or frame 38 and a cup-shaped cover 40 of thin-walled material. The cover 40, together with the adjacent end wall of the housing 38, provides a chamber for receiving various components of the electrical system with which the alternator is used. The outer or right-hand end of the cover 40, as viewed in FIG. 1 and as seen in FIG. 3, has openings, through which pass items such as electrical terminals 41, 41, and an elongated slot 42 for entry of cooling air. The cover is held to the housing by a number of screws 43, 43 which when removed free the cover for removal from the housing.

Figure 4:
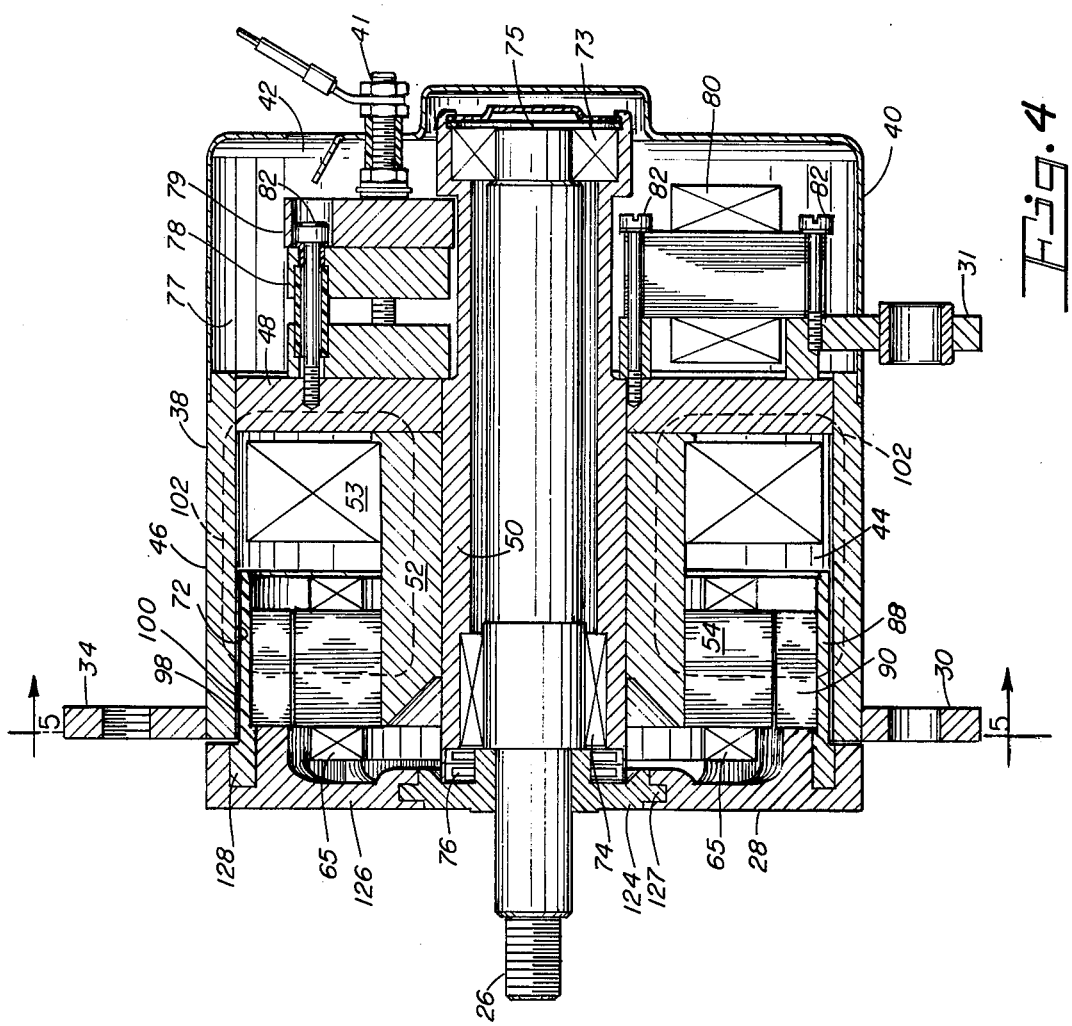
FIG. 4 is a longitudinal sectional view taken on the line 4—4 of FIG. 2.
Figure 6:
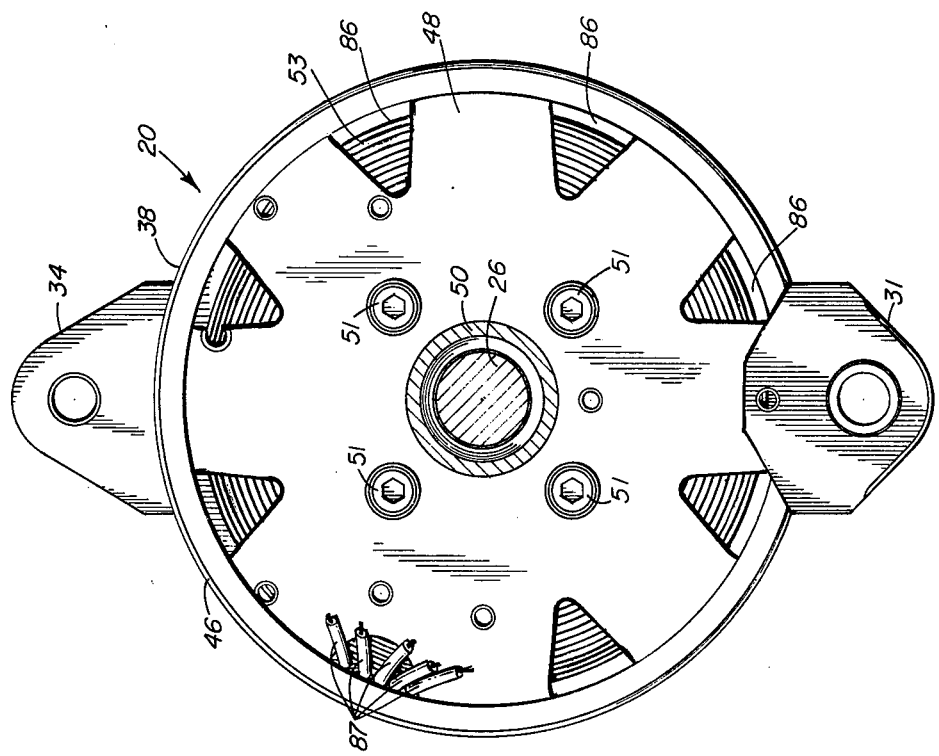
FIG. 6 is a transverse sectional view taken on the line 6—6 of FIG. 4.
Figure 5:
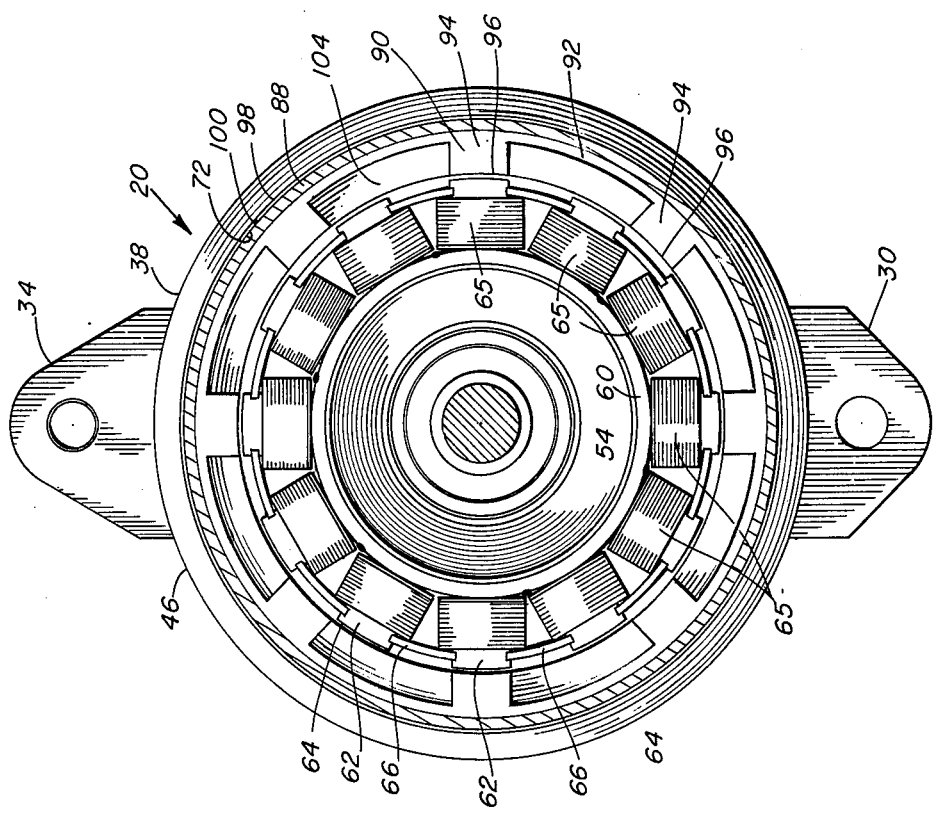
FIG. 5 is a transverse sectional view taken on the line 5—5 of FIG. 4.

Reference is now made to FIGS. 4, 5 and 6 for an understanding of further constructional details of the alternator 20. Considering first the stator structure, the stator housing 38 is generally in the shape of a hollow cylinder, open at one end and substantially closed at the other end, having a central support extending axially from the closed end toward its open end so as to define an annular cavity 44 inside the housing. To provide this form, the housing could, if desired, be made as one-piece. As shown, it comprises a number of parts including a tubular outer shell 46, a disc shaped end wall 48, an elongated tubular shaft retainer 50, and a tubular support 52 fitted over the shaft retainer. The shell 46, end wall 48 and shaft retainer 50 are affixed to one another to form a unitary rigid structure. The support 52, on the other hand, has a close slip fit with the retainer 50 so as to be accurately centered by the retainer and is held in place tightly against the end wall 48 by suitable means such as by four screws 54, 54 (see FIGS. 6 and 10) passing loosely through the end wall and threaded into the support. The shell 46, end wall 48 and support 62 together define the previously mentioned annular cavity 44 which is substantially closed by the end wall 48 at its right-hand end and which is open at its other or left-hand end, as viewed in FIG. 4.

Positioned in the substantially closed end portion of the stator cavity 44 is an annular field coil 53, for establishing a quiescent magnetomotive force in the magnetic circuits of the alternator as will be appreciated. Also in the stator cavity, adjacent the open end thereof, is an annular stator core 54 comprised of laminated magnetic material. The field coil 53 fills most of the closed end portion of the cavity 44. Its outer edge is, however, spaced from the shell 46 so as to allow an annular space for the flow of cooling air past it and to accommodate leads passing from the generating windings 65, 65 and the stator core 54 to the chamber enclosed by the cover 40. The stator core 54 includes a radially inner continuous annular portion 60 and an angularly spaced series of radially outwardly extending teeth 62, 62 having a radially outwardly facing tooth face 64 of its outer end, the tooth faces 64, 64 comprising a circumferential series of such tooth faces located in a common imaginary circle. On each stator tooth 62 is a generating winding 65. These windings are held in place on their teeth by suitable mechanical means 66. The stator core itself fits over and is fixed to the tubular support 52.

At the open end of the stator cavity 44, the outer shell 46 of the stator housing 38 includes a radially inwardly facing cylindrical surface 72 comprising one surface of a parasitic air gap 100 through which magnetic flux passes from one to the other of the rotor and the stator housing.

The shaft retainer 50 extends through the length of the annular stator cavity 44 and for some distance outwardly beyond the end wall 48. The shaft 26 extends through the entire length of the retainer 50 and is supported at its right-hand end, as viewed in FIG. 4, by a bearing assembly 73 and at its left-hand end by a bearing assembly 74. Further, the interior of the retainer 50 is of a substantially larger diameter than the shaft 26 so as to provide a large reservoir for a sufficient quantity of lubricant to last for the expected life of the alternator. In connection with this, it will also be noted that the shaft 26 does not extend beyond the right-hand end of the retainer and thus a non-rotating seal, such as the cap 75, may be used to seal that end of the retainer. As its other end, the retainer is sealed by a suitable dynamic sealing system 76.

The cup-shaped cover 40, shown best in FIG. 4, encloses that portion of the shaft retainer 50 which extends to the right of the end wall 48, and together with the shaft retainer 50 and end wall 48 defines an annular chamber 77 containing terminals and various components of the electrical system with which the alternator is used. For example, in the illustrated case the chamber includes a main rectifier 78 and a voltage regulator 79 for rectifying the alternating current output voltages induced in the generating windings 65, 65 into a DC output voltage and for regulating the value of such DC output voltage. Also included is another rectifier (not shown) and an isolation transformer 80 adapting the alternator for a dual battery vehicle electical system as shown by U.S. Pat. No. 3,816,805. It will be understood, however, that these components are shown by way of example only and that the chamber 77 may be used to contain other different components according to the application to which the alternator is put. In any event, such components are preferably mounted onto the end wall 48, as by illustrated screws 82, 82, so that when the cover is removed they are exposed for inspection and access while nevertheless being retained in place relative to the stator structure.

As mentioned, cooling air flow is induced through the alternator by vanes formed in the rotor. To allow passage between the chambers 77 and 44 of the stator housing, the end wall 48, as best shown in FIG. 6, includes a series of openings 86, 86 along its outer periphery. One of these openings also serves to provide passage for a plurality of leads 87, 87 passing from the generating windings 65, 65 and the field winding 53 to the components in the component chamber 77.

Considering next the construction of the rotor 28, and referring to FIGS. 4, 5, 7, 8 and 9, variable reluctance portion or core of the rotor is located within the stator housing 38 and includes a tubular outer sleeve 88 and a stack 90 of laminations received within such sleeve. This rotor core surrounds the stator core 54 and is located within the annular space between the stator pole faces 64, 64 and the cylindrical surface 72 of the housing shell. The lamination stack 90 has an outer annular portion 92 and a series of angularly spaced poles 94, 94 having radially inwardly facing pole faces 96, 96 which define active air gaps with the stator tooth faces 64, 64 that vary in area as the rotor rotates. The outer surface 98 of the sleeve 88 is cylindrical and cooperates with the cylindrical stator surface 72 to define the aforesaid parasitic air gap 100. Although the parasitic air gap is shown as continuous, it might also comprise discontinuous portions respectively corresponding to the rotor poles. However, in the presently preferred embodiment, the stator portion of the parasitic gap would still be continuous so that the parasitic gap reluctance would still be constant.

When the field coil 53 is energized, magnetic flux is caused to exist generally along mean flux paths such as that indicated by the broken lines 102, 102 of FIG. 4. Such a flux circuit includes the parasitic air gap 100 and the active air gaps provided between the stator teeth and rotor poles, the movement of the rotor poles relative to the stator teeth causing varying reluctance in such flux circuits and therefore producing varying flux linking the individual stator teeth, and thus inducing voltages in the generating windings 65, 65. In the illustrated embodiment, the eight rotor oles 94, 94 and the twelve stator teeth 62, 62, together with an appropriate interconnection of the windings 65, 65 produce a three phase alternating output current. This, however, is not critical to the invention and if desired, different ratios of stator and rotor poles and correspondingly different interconnections of the generating windings may be used to produce either a single phase alternating current output or another type of multiple phase alternating current output. In general, for three phase output, a 3 to 2 ratio of stator to rotor poles is preferred.

It will be noted that only a portion of the mean magnetic circuit is of laminated construction. In general, such laminated construction is desirable in the vicinity of the active air gap where there are substantial flux variations and thus potential eddy currents. However, since the sum total of the active air gap areas is substantially independent of rotation, the flux in most of the remainder of the flux path will be substantially constant thus permitting nonlaminated construction.

The core portion of the rotor is connected with the shaft 26 by other parts which are located externally of the stator housing and which also provide a fan for moving cooling air through the alternator. These external parts include a hub 124 adapted to be fixed to the shaft 26 and made of steel or similar material. The hub 124 is an initially separate part, machined or otherwise formed to its desired shape, and having a circular peripheral edge portion 127. From this peripheral edge portion of the hub to the tubular sleeve 88, the rotor includes a web portion 126 made of aluminum or other lightweight non-magnetic material. This web portion is fixed to and captures the peripheral edge portion 127 of the hub and an edge portion 128 of the sleeve 88 which extends outwardly a small distance from the stator housing.

Figure 9:
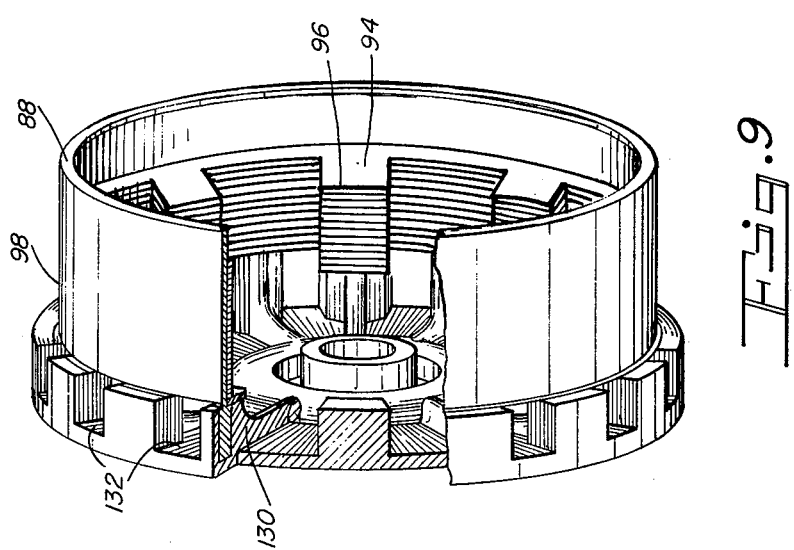
FIG. 9 is a perspective view of the rotor of the alternator of FIG. 1.

As shown best in FIGS. 7, 8 and 9, the web portion 126 of the rotor is shaped, on its axially inwardly facing surface, to define a plurality of radially extending vanes 130, 130 alternating with an equal number of radial slots 132, 132. The slots register with notches 134, 134 in the tubular sleeve so as not to be interrupted by the sleeve. As the rotor rotates the vanes therefore expel air from the alternator to establish a flow through the alternator from the right to left as viewed in FIG. 4. Of course, other convective or conductive cooling means may also be utilized in combination with or in substitution for the air impeller vanes 130, 130, if desired.

The aforedescribed construction of the alternator 20 is also such as to allow a simple method of assembly. In particular, and referring to FIG. 10, the stator structure is made of two basic units or subassemblies which may be fabricated separate from one another. The first unit is the stator housing. The other unit is a subassembly 136 comprised of the tubular support 52, the field coil 53, the stator core 54 and the generating windings 65, 65. To make the final assembly of the alternator the subassembly 136 is moved into the stator housing 38 with the tubular support of the subassembly fitting over the shaft retainer 50, and the tubular support is then fixed to the housing by the screws 51,51. Then, in any desired sequence, and omitting minor details the rotor is fixed to the shaft 26 together with the pulley 24 and its associated retaining nut 25, the shaft 26 and the bearings 73 and 74 are fitted into the shaft retainer 50, the associated electrical components (not shown in FIG. 11) are mounted to the exposed face of the end wall 48, the proper electrical connections are made, and the cover 40 is finally secured to the stator housing.

Figure 11:
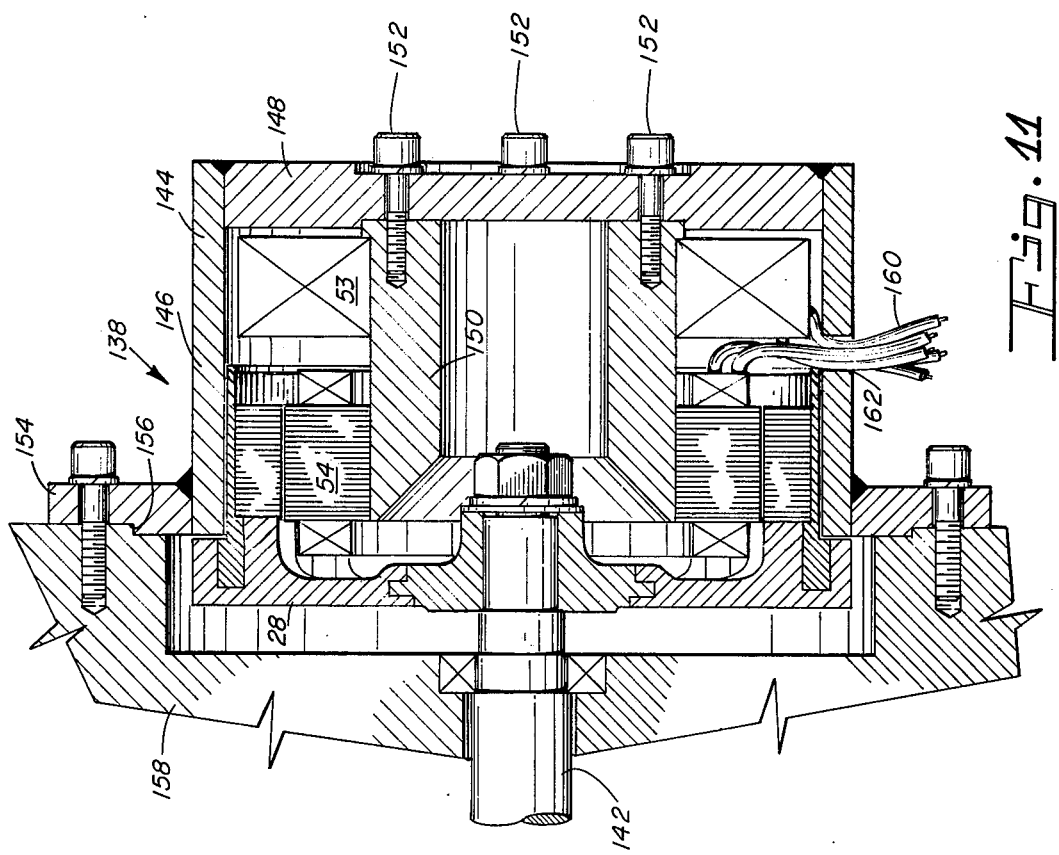
FIG. 11 is a longitudinal sectional view generally similar to FIG. 4 but showing an alternate exemplary embodiment of the invention.

FIG. 11 shows an alternative exemplary embodiment of the invention in the form of an alternator, indicated generally at 138, having a rotor 28 connected to the end portion of an independently supported shaft 142 which may, for example, be an engine crank shaft or cam shaft. The alternator 138 is in many respects similar to the alternator 20 shown in FIGS. 1–10 and parts of its which are the same as corresponding parts of the alternator 20 have been given the same reference numbers as in FIGS. 1–10 and need not be redescribed.

The alternator 138 includes a stator housing 144 comprised of a cylindrical tubular shell 146, a disc shaped end wall 148 and a generally cylindrical central support 150. An annular mounting flange 154 has an annular shoulder 156 adapted to mate with a complementary shoulder in the engine structure 158 to accurately center the stator housing relative to the axis of the shaft 142.

The central support 150 carries the field coil 53 and the stator core 54 with its generating windings 65, 65. Therefore, these parts form a subassembly similar to the subassembly 136 of FIG. 10 which may be fabricated separate from the stator housing 144 and subsequently assembled therewith through the use of the screws 152, 152. The illustrated alternator 138 does not include a cover similar to the end cover 40 of the alternator 20, and the various leads indicated generally at 160 pass through an opening 162. The electronics associated with the alternator (i.e, rectifiers, voltage regulator, etc.), may be integrally mounted similar to the FIGS. 1–10 embodiment or these electronics may be remotely located and electrically connected via leads 160. The end wall 148 may contain a suitable vent opening or openings to allow passage of cooling air into the interior of the stator housing if air impeller vanes are included in the rotor 28. On the other hand, in some cases such air openings and air impeller vanes on the rotor may be eliminated, and heat dissipation may be provided for by other means such as convective or conductive means. For instance, cooling fins may be formed on the outer surface of the shell 146 and end wall 148. In such cases of hermetic construction, the opening 162, through which the leads 160 pass, may be also hermetically sealed with a suitable sealing agent to provide a totally enclosed and explosion proof alternator.

What is claimed is:

1. A variable reluctance inductor alternator having relatively large diameter, large area air gaps thereby requiring minimum magnetomotive force to transfer magnetic flux therethrough for a given design size and having efficient cooling air flow structures integrated therewith said alternator comprising:

a stator structure having magnetic flux carrying material therein including a radially inwardly directed face and a radially outwardly directed tooth face, said stator structure including said faces defining an annular cavity closed at one end and open at the other, a rotor structure being mounted for rotational movement with respect to said stator structure in a position to close the open end of said annular cavity, said rotor structure including an annular portion having magnetic flux carrying material therein disposed in said annular cavity and including a radially outwardly directed face and a radially inwardly directed pole face;

said stator structure and said rotor structure being arranged to define at least one mean magnetic flux carrying path passing through the magnetic flux carrying material of both said stator structure and said rotor structure, said flux path including (1) at least one parasitic air gap defined by said radially inwardly directed face of said stator structure and said radially outwardly directed face of said rotor portion and having a substantially constant magnetic reluctance and (2) at least one active air gap defined by said outwardly directed tooth face of said stator structure and by said inwardly directed pole face of said rotor portion and having a magnetic reluctance which varies as a function of the rotational position of said rotor structure;

said parasitic air gap being radially outwardly relative to said active air gap such that for any given flux level in the flux path, the flux density in said active air gap always exceeds the flux density in said passive air gap whereby the magnetic flux carrying material defining the active air gap tends to magnetically saturate before the magnetic flux carrying material defining the parasitic air gap thus effectively removing the parasitic air gap as a serious design restraint;

flux establishing means within said annular cavity for establishing a quiescent magnetomotive force within said flux path such that a magnetic flux is established in said active air gap which flux varies as a function of the rotational position of said rotor structure and inversely with respect to the variable reluctance of said active air gap, electrical output means operatively associated with said active air gap for providing an induced electrical output therefrom in response to varying flux in said active air gap, said rotor structure having a plurality of annularly spaced fan blades within the open end portion of the annular cavity closed by said stator structure and a plurality of annularly spaced air outlet openings formed therein in cooperating relation with said blades leading exteriorly from said annular cavity at the open end portion thereof closed by said rotor structure, said stator structure having a plurality of annularly spaced air inlet openings leading interiorly into said annular cavity at the one end thereof so that upon rotational movement of said rotor structure the movement of said blades will cause cooling air to be drawn interiorly within the one end portion of said annular cavity through said inlet openings, past said flux establishing means, said electrical output means and the material defining said active air gap and to be blown exteriorly from the other end portion of said annular cavity directly through the cooperating outlet openings in said rotor structure.

2. A variable reluctance inductor alternator as defined in claim 1 wherein said parasitic air gap is also constructed relative to said active air gap such that the reluctance of said parasitic air gap is always less than the minimum reluctance of said active air gap thereby even further removing the parasitic air gap as a design restraint.

3. A variable reluctance inductor alternator as defined in claim 1 wherein said parasitic air gap and active air gap are located so as to increase flux leakage path lengths therefrom and thus effectively reduce the amount of leakage flux for a given overall mean flux path length.

4. A variable reluctance inductor alternator as defined in claim 1 wherein:

said stator structure comprises a radially outer tubular shell portion, an end wall portion substantially magnetically closing one end of said tubular shell portion, and a central portion inside said tubular shell portion extending axially from said end wall portion toward the opposite end of said shell portion, said central portion including an annular stator core adjacent said open end thereof and having an annular series of angularly spaced stator teeth with radially outwardly directed tooth faces, said air inlet openings being formed in said end wall portion, said annular portion of said rotor structure having a generally cylindrical radially outer surface defining said parasitic air gap with said tubular shell portion and also having an annular series of angularly spaced rotor poles with radially inwardly directed pole faces defining said active air gap with said stator tooth faces, said flux establishing means comprising an annular field coil, and said electrical output means comprising a plurality of generating windings disposed about said stator teeth.

5. A variable reluctance inductor alternator as defined in claim 4 wherein said annular portion of said rotor comprises a radially outer tubular sleeve and an annular stack of laminations received within and fixed to said sleeve, said annular stack of laminations having a radially outer annular portion engaging said sleeve and also including said plurality of rotor poles which extend radially inwardly from said annular portion.

6. A variable reluctance inductor alternator as defined in claim 5 wherein said rotor structure includes an initially separate hub adapted for attachment to a shaft, and a web portion formed of non-magnetic material extending radially from said hub to said tubular sleeve and fixed to both said hub and said sleeve.

7. A variable reluctance inductor alternator as defined in claim 6 wherein said web portion has an inboard face directed toward said annular cavity which inboard face is shaped to provide said plurality of fan blades which extend generally radially, said outlet openings being formed in said sleeve at positions between the outer ends of adjacent blades.

8. A variable reluctance inductor alternator as defined in claim 7 wherein said tubular sleeve has an outboard edge portion, said web portion being made of a cast material which captures a peripheral edge portion of said hub and said outboard edge portion of said tubular sleeve, said outboard edge portion of said tubular sleeve having a series of notches therein registered with said openings.

9. A variable reluctance inductor alternator as defined in claim 8 further characterized by said central portion of said stator structure including a radially inner part permanently fixed to said end wall portion, a tubular support surrounding said inner part wiith a slip fit, and releasable means holding said tubular support in place of said inner part, said field coil and said stator core being fixed to said tubular support whereby said tubular support, said field coil, said stator core, and said generating windings form a subassembly removable from said stator housing as a unit upon release of said releasable holding means.

10. A variable reluctance inductor alternator as defined in claim 9 wherein said part of said central portion of said stator structure constitutes a tubular shaft retainer fixed to said end wall portion, said shaft retainer extending axially through the length of said annular cavity and through a substantial distance outwardly beyond said end wall portion, a shaft received in said shaft retainer, two bearings located respectively at opposite ends of said shaft retainer for rotatably supporting said shaft, said shaft at the end thereof adjacent said open end of said housing cavity having an outboard portion extending out of said retainer.

11. A variable reluctance inductor alternator as defined in claim 10 wherein said shaft having a diameter substantially smaller than the interior diameter of said retainer so as to provide a lubricant reservoir between said shaft and said retainer, said shaft at the end thereof opposite from the open end of said annular cavity being located entirely within said retainer, and a cap attached to said retainer sealing the end thereof adjacent said latter shaft end to prevent the escape of lubricant from said retainer.

12. A variable reluctance inductor alternator as defined in claim 4 wherein a cup-shaped cover is removably attached to said stator structure adjacent said end wall portion thereof and forming with said end wall portion, a cavity, a rectifier in said cavity for rectifying alternating current voltages induced in said generating windings into a direct current output voltage, and means attaching said rectifier to said end wall portion, said cover having an inlet for passing cooling air to said air inlet openings.

13. A variable reluctance inductor alternator comprising:
a stator structure defining an outside radially inwardly directed cylindrical face and an inside radially outwardly directed toothed face including a plurality of radially outwardly projecting poles thereon, said stator structure including said faces defining an annular cavity open at one end and closed at the other;
a rotor structure mounted for rotation with respect to said stator structure, said rotor structure including an annular portion disposed within said annular cavity;
said annular portion having an outside radially outwardly directed cylindrical face and an inside radially inwardly directed toothed face including a plurality of radially inwardly projecting poles thereon;
said cylindrical faces defining a parasitic air gap having a substantially constant magnetic reluctance;
said toothed faces with projecting poles defining an active air gap having a magnetic reluctance which varies locally with respect to a given pole as a function of the rotational position of said rotor member;
a field winding disposed within said annular cavity for establishing a quiescent magnetic field within and through said stator member, said rotor member, said parasitic air gap and said active air gap;
generating windings disposed about the projecting poles on said stator structure for providing an induced electrical current output therefrom in response to varying magnetic flux within the poles of the stator caused by rotation of the rotor member and the resultant varying magnetic reluctance in the active air gap,
said rotor structure having a plurality of annularly spaced fan blades within the open end portion of the annular cavity closed by said stator structure and a plurality of annularly spaced air outlet openings formed therein in cooperating relation with said blades leading exteriorly from said annular cavity at the open end portion thereof closed by said rotor structure,
said stator structure having a plurality of annularly spaced air inlet openings leading interiorly into said annular cavity at the one end thereof so that upon rotational movement of said rotor structure the movement of said blades will cause cooling air to be drawn interiorly within the one end portion of said annular cavity through said inlet openings, past said windings and the material defining said active air gap and to be blown exteriorly from the other end portion of said annular cavity directly through the cooperating outlet openings in said rotor structure.

* * * * *